United States Patent

[11] 3,558,123

| [72] | Inventor | Ming-Chih Yew |
| | | Utica, Mich. |
| [21] | Appl. No. | 769,905 |
| [22] | Filed | Oct. 23, 1968 |
| [45] | Patented | Jan. 26, 1971 |
| [73] | Assignee | General Motors Corporation |
| | | Detroit, Mich. |
| | | a corporation of Delaware |

[54] COMPOSITE SPRING ASSEMBLY
5 Claims, 3 Drawing Figs.
[52] U.S. Cl. .................................................. 267/34,
267/65; 280/124
[51] Int. Cl. .................................................. B60g 11/58
[50] Field of Search .......................................... 267/34,
65C; 280/124

[56] References Cited
UNITED STATES PATENTS
1,840,178  1/1932  Transom ..................... 267/34
3,003,758  10/1961  Francis ....................... 267/67(C)UX

*Primary Examiner*—A. Harry Levy
*Attorneys*—W. E. Finken and D. L. Ellis

ABSTRACT: A vehicle suspension system in which a vacuum energized auxiliary spring is arranged in opposed relation to a primary suspension spring disposed in compression between the sprung and unsprung mass of the vehicle, with the auxiliary spring being operatively connected to one of the masses by an element which is linearly stable in tension and collapsible in compression.

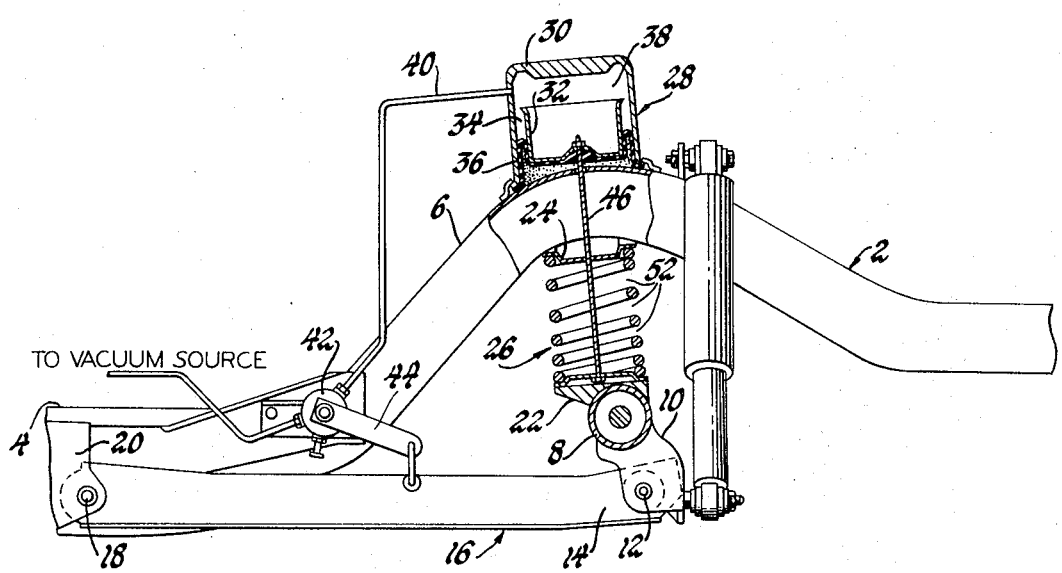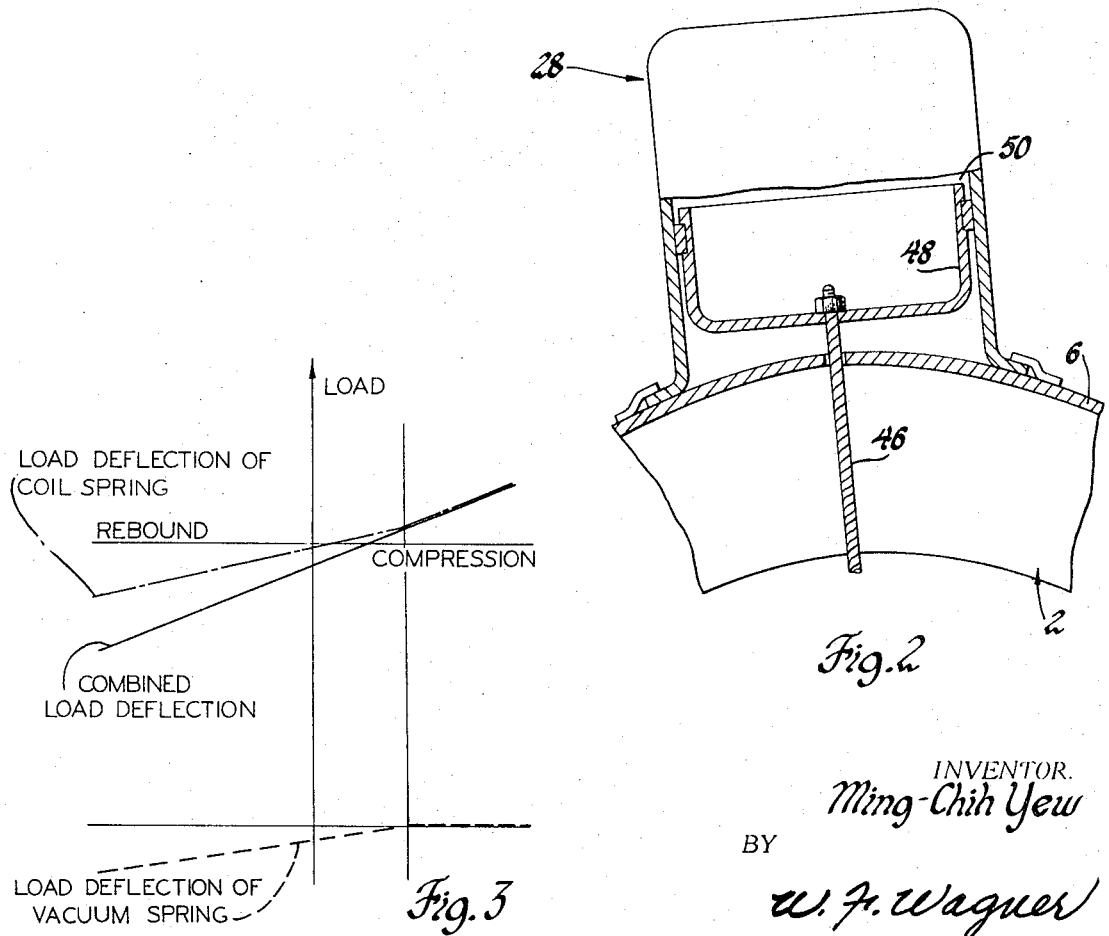

COMPOSITE SPRING ASSEMBLY

This invention relates to composite spring assemblies and particularly to arrangements of subatmospheric pressure energized auxiliary springs disposed in opposed relation to primary suspension springs.

An object of the present invention is to provide an improved composite spring assembly.

Another object is to provide a composite spring assembly in which the primary suspension spring is calibrated to support the sprung mass of the vehicle, at curb weight, above a predetermined design height, with the subatmospheric pressure energized auxiliary spring acting to simulate load under all conditions in which all or any part of the full load complement of the sprung mass is absent.

A still further object is to provide an arrangement of the type described in which the auxiliary spring includes means for disabling displacement thereof as a result of compression deflection of the sprung and unsprung mass beyond the vertical spacing establishing design height.

A still The foregoing and other objects, advantages and features of the invention will become more readily apparent as reference is had to the accompanying specification and drawings wherein:

FIG. 1 is a partial side elevational view of a vehicle suspension system in accordance with the invention;

FIG. 2 is a fragmentary view of a modified form of the invention; and

FIG. 3 is a graph showing the load deflection characteristics of a suspension system in accordance with the invention.

Referring now to the drawings and particularly FIG. 1, there is shown a portion of a vehicle in which the reference numeral 2 generally designates the frame portion of the sprung mass. Frame 2 includes a longitudinally extending side rail 4 having an upwardly arched portion 6 overlying a transversely directed wheel supporting axle housing 8. It will be understood that a corresponding side rail is disposed at the opposite side of the vehicle similarly overlying axle 8 and that all of the subsequently described suspension assembly related to one side of the vehicle is identical to that existing on the opposite side. Connected to and depending from axle housing 8 is a bracket 10 which is pivotally connected at 12 to the rearward end 14 of a longitudinally extending suspension control arm 16. The forward end of arm 16 is in turn pivotally connected at 18 to a depending bracket 20 secured to side rail 4. Disposed in compression between lower spring see seat 22 on angle 8 and upper spring seat 24 on arched portion 6 is a coil spring 26. In accordance with one feature of the invention, coil spring 26 is initially formed to provide a load sustaining capability which will elastically support the portion of the sprung mass adjacent thereto at an elevation in excess of design height. For the purpose of this application, the expression "design height" is intended to mean a height above the ground such that the entire vehicle exhibits a level attitude, i.e., parallel with the ground when the sprung mass is supporting a predetermined normal load complement of passengers, fuel, and cargo. The term "design height" is used in contrast to "curb height" which is intended to denote the same vehicle absent the normal load complement.

Since it will be evident that a vehicle constructed in the manner thus far described would under all load conditions of less than normal load complement exhibit a nosedown attitude, according to one feature of the invention, a vacuum energized variable rate spring assembly 28 is disposed on the sprung mass and arranged in opposed parallel relation to the coil spring 26. In the preferred embodiment shown in FIG. 1, vacuum spring 28 includes an inverted cuplike cylinder 30 mounted on side rail 4 in vertical alignment with the axis of spring 26. Reciprocably disposed in cylinder 30 is a cuplike piston 32. The annular gap 34 formed between the side walls of the cylinder and piston is bridged by an imperforate flexible rolling lobe diaphragm 36. The closed variable volume chamber 38 formed thereby is connected to an engine source of vacuum by a conduit 40. Interposed in conduit 40 is a leveling valve 42 having a control lever 44 connected to suspension control arm 16. Control lever 44 correlates the position of valve 42 relative to displacement between the sprung and unsprung mass so that vacuum is applied to chamber 38 to produce a simulated load equal to the difference between the actual load and the normal load complement required to produce design height. In this way, the assembly not only achieves regulation of the level attitude of the vehicle for all actual load conditions between curb height and design height, but additionally functions in a "fail safe" manner, i.e., in the event of failure of the vacuum spring, elastic support of the sprung mass is increased rather than diminished or totally destroyed.

In the past, application of vacuum springs in composite relation with primary suspension springs in the manner described produced certain problems which are overcome by an arrangement in accordance with the present invention. By way of explanation, it will first be apparent that in such arrangements, ideally, the vacuum spring should become functionally ineffective when the actual load on the sprung mass matches the so-called normal load complement. However, in prior art constructions, the vacuum spring per se, whether of the piston, cylinder and rolling lobe diaphragm type or of the opposed cylinder type, nevertheless continues to function if both the compression and rebound mode. Consequently, even when the interior of the vacuum spring is at atmospheric pressure and with the coil spring totally supporting the sprung load, any compression movement between the sprung and unsprung mass necessarily results in creation of superatmospheric pressure within the chamber 38. In the case of the piston, cylinder and diaphragm type spring shown in FIG. 1, such pressure transition produces undesirable buckling of the diaphragm and possible abrasive destruction thereof. While the opposed cylinder type vacuum spring shown in FIG. 2 is not similarly affected, significant compression deflection following transition to superatmospheric pressure causes an undesirably rapid rate buildup. To overcome this disadvantage in accordance with the principal feature of the invention, the piston 32 of vacuum spring assembly 28 is operatively connected to the spring seat 22 by means of a load transfer element which in the illustrated embodiment takes the form of a flexible cable 46. Cable 46 is fabricated so as to be essentially linearly stable in tension but freely collapsible in compression with the result that when the pressure in chamber 38 reaches atmospheric, further compression of spring 26 resulting from transient wheel deflection is ineffective to displace the piston 32 upwardly in cylinder 30. In consequence, no superatmospheric pressure is generated in chamber 38 and the normal contour of the convolution of rolling lobe diaphragm 36 is undisturbed, thereby eliminating possibility of buckling or damage. However, should such transient excursions include rebound displacement of the sprung mass relative to the unsprung mass above the predetermined design height, cable 46 resumes operational efficacy by exerting a downward displacement of the piston 32 to create a gradually increasing subatmospheric condition acting to damp such excursion. Naturally, upon cessation of such excursion, the piston will return to a balanced position within the cylinder by the action of external atmospheric pressure acting on the diaphragm until the volume of the chamber 38 has been reduced sufficiently to restore a corresponding atmospheric pressure therein.

In the embodiment shown in FIG. 2, the flexible cable 46 acts on the lower cylinder 48 in a manner similar to that just described with respect to piston 32, the singular difference being that the linear collapsibility of the cable in compression prevents creation of superatmospheric pressure in the chamber 50 which would otherwise be sufficient to produce an undesirably rapid rate buildup.

In order to further enhance dynamic response of the composite spring assembly, in accordance with another feature of the invention, the coil spring 26 is preferably formed to provide a variable rate, i.e., one in which the spring rate progressively increases with compression deflection commencing with compression deflection beyond its full load complement compression condition. To this end, the spacing 52 between individual coils of the helix are progressively decreased from the vertical center of the spring toward either or both ends. In this manner, individual coils sequentially bottom with compression of the spring causing the remaining coils to display progressively higher spring rate. As shown in FIG. 3, the progressive spring rate so achieved is preferably correlated with the spring rate provided by the vacuum spring so that no abrupt spring rate transition occurs as the sprung mass deflects above and below the level at which the vacuum spring becomes functionally inoperative.

While two embodiments of the invention have been shown and described, it will be apparent that other changes and modifications may be made therein. It is, therefore, to be understood that is it is not intended to limit the invention to the embodiments shown.

I claim:

1. In a composite spring assembly for a vehicle including a subatmospheric pressure energized auxiliary spring arranged in parallel opposed relation with a primary suspension spring having load supporting capability sufficient to support the adjacent portion of a vehicle at a predetermined design height under full load complement conditions, said auxiliary spring acting to simulate load under less than full load complement conditions, the improvement comprising means for disabling displacement of said auxiliary spring responsive to compression deflection of said primary spring beyond its full load complement compression condition.

2. A composite spring assembly for a vehicle comprising a variable rate coil type primary suspension spring arranged in compression between a sprung mass and an unsprung mass of said vehicle, said primary spring supporting said sprung mass above design height at curb weight, a subatmospheric pressure energized auxiliary spring arranged in a parallel relation with said primary spring and disposed concentrically thereto, said auxiliary spring including a vacuum energized chamber formed by a piston and cylinder connected by a rolling lobe diaphragm, and means connecting said auxiliary spring between said sprung mass and said unsprung mass in a manner providing positive action in tension and impositive action and compression.

3. A composite spring assembly as recited in claim 2 wherein the rate of said primary suspension spring increases approximately inversely proportional to decrease in rate of said auxiliary spring during compression deflection of said sprung mass and said unsprung mass beyond design height.

4. In a vehicle having a primary suspension spring arranged in compression between a sprung mass and an unsprung mass of said vehicle, a vehicle attitude control system comprising a subatmospheric pressure energized auxiliary spring arranged in parallel relation with said primary spring, a source of subatmospheric pressure, valve means operable to energize said auxiliary spring by introducing thereto subatmospheric pressure from said source thereof in response to deviation of the attitude of said vehicle from a predetermined attitude thereby to maintain said predetermined vehicle attitude, and means connecting said auxiliary spring between said sprung and said unsprung masses of said vehicle in a manner providing resilient resistance only to relative separating movement between said sprung and said unsprung masses.

5. In a vehicle having a primary suspension coil spring arranged in compression between a sprung mass and an unsprung mass of said vehicle, a vehicle attitude control system comprising a subatmospheric pressure energized auxiliary a spring arranged in parallel relation with said primary spring and disposed concentrically thereto, said auxiliary spring including a vacuum energized chamber formed by a piston and a cylinder connected by a rolling lobe diaphragm, a source of subatmospheric pressure, valve means operable to energize said auxiliary spring by introducing into said vacuum chamber subatmospheric pressure from said source thereof in response to deviation of the attitude of said vehicle from a predetermined vehicle attitude thereby to maintain said predetermined vehicle attitude, and means connecting said auxiliary spring between said sprung and said unsprung masses in a manner providing resilient resistance only to relative separating movement between said sprung and said unsprung masses.